United States Patent
Rapoport et al.

[11] Patent Number: 5,589,931
[45] Date of Patent: Dec. 31, 1996

[54] SYSTEM TO DETERMINE ENVIRONMENTAL PRESSURE AND BIREFRINGENT-BIASED CLADDED OPTICAL SENSOR FOR USE THEREIN

[75] Inventors: William R. Rapoport; Janpu Hou, both of Bridgewater, N.J.

[73] Assignee: AlliedSignal Inc., Morris Township, N.J.

[21] Appl. No.: 406,331

[22] Filed: Mar. 17, 1995

[51] Int. Cl.[6] .................................................. G01B 11/16
[52] U.S. Cl. ........................ 356/33; 356/364; 73/800
[58] Field of Search ........................ 356/33, 34, 35, 356/364, 365, 366, 367; 250/225, 227.17, 231.19; 73/800

[56] References Cited

U.S. PATENT DOCUMENTS

| | | | |
|---|---|---|---|
| 4,466,295 | 8/1984 | Wesson | 73/862.38 |
| 4,757,195 | 7/1988 | Katagiri et al. | 250/227.17 |
| 5,255,068 | 10/1993 | Emo et al. | 356/351 |

FOREIGN PATENT DOCUMENTS

| | | | |
|---|---|---|---|
| 702801 | 6/1981 | U.S.S.R. | 356/33 |

Primary Examiner—Richard A. Rosenberger
Attorney, Agent, or Firm—Verne E. Kreger, Jr.

[57] ABSTRACT

A cladded birefringent pressure sensor for use in a pressure-sensing system. The sensor is a single composite plate consisting of two plates each with different indices of refraction. One surface of the sensor is exposed to the environmental pressure under measurement. A collimated broad band light source is transmitted via a fiber optic cable, a polarizer and a birefringent bias element which transmits a wavelength/polarization component of light through the sensor. An external force applied to the sensor adds a stress-induced component to the polarized lightwave. The lightwave exits the sensor and is captured by a second polarizer producing a modulated light spectrum. A focusing element collects the light and transmits it down another fiber optic cable. The cable transmits the light to an opto-electronic interface where the fringe pattern is extracted and a computer compatible signal is generated for a CPU. The CPU performs a Fourier transform on the fringe pattern, where the phase term for a selected frequency is the measure of the externally applied pressure on the sensor.

9 Claims, 8 Drawing Sheets

SYSTEM TO DETERMINE ENVIRONMENTAL PRESSURE AND BIREFRINGENT-BIASED CLADDED OPTICAL SENSOR FOR USE THEREIN

FIELD OF THE INVENTION

This invention relates to photoelastic sensing means, and more particularly to a birefringent-biased cladded optical sensor and an associated pressure sensing system.

BACKGROUND OF THE INVENTION

The invention relates to using photoelastic means to detect and quantify stress levels inside a sensor substrate that relate directly to external forces applied to the sensor substrate. Wesson describes in U.S. Pat. No. 4,466,295 means for using the photoelastic effect to measure stress in plates that can be related to externally applied forces. The sensor disclosed in Wesson is not particularly effective because the output signal is light intensity dependent and is adversely sensitive to environmental effects to the overall sensor system. A further drawback is that the sensor output is linear over only a narrow pressure range. Therefore, one must calibrate multiple sensors over different pressure ranges.

Sensing devices utilizing birefringent crystals have been described for temperature by Emo et al. in U.S. Pat. No. 5,255,068 entitled "Fringe Pattern Analysis of a Birefringent Modified Spectrum to Determine Environmental Temperature" which is incorporated herein by reference. Emo et al. describe an optical high temperature sensor based on a birefringent element made of a single crystal. A broad band light spectrum is transmitted through a first linear polarizer creating a linearly polarized wave. The linearly polarized wave passes through a single crystal birefringent plate at 45° to the optical axis of the crystal. The polarized wave can be represented by two equal linear polarized vectors which are aligned along the optical axes. Propagation of these waves through the birefringent plate introduces a temperature dependent phase shift between the two waves. Thereafter, a second linear polarizer combines the two waves creating a modulated spectrum. Information derived from this modulated spectrum or fringe pattern is then used to measure the temperature of the birefringent plate.

SUMMARY OF THE INVENTION

The present invention consists of a cladded birefringent pressure sensor comprising of a first plate and a second plate each with different indices of refraction. One surface of the sensor is exposed to the environmental pressure under measurement. A collimated broad band light source is transmitted via a first fiber optic cable, a first polarizer and a birefringent bias element which transmits a wavelength/polarization component of light through the first plate of the sensor. Light exits the sensor which is captured by a second polarizer whose axis is parallel or perpendicular to the first polarizer producing a wavelength modulated light spectrum. A focusing element collects the light and transmits it down a second fiber optic cable. The cable transmits the light to an opto-electronic interface where an intensity vs. wavelength (fringe) pattern is extracted by a CPU. The CPU performs a Fourier transform on the fringe pattern, and the phase term of the selected frequency relates to the externally applied pressure on the sensor.

It is an object of this invention to provide a sensor that is capable of accurately measuring the effects of external pressure applied to the sensor.

It is a further object of this invention to provide a sensor that is capable of accurately measuring the effects of external pressures applied to the sensor with reduced tolerances for positionally locating the optical transmitter and receiver fiber optic assembly.

It is still a further object of this invention to provide a sensor that is capable of accurately measuring the effects of an external pressure applied to the sensor plate by confining the light to a small, well defined integration area from which a higher signal to noise ratio can be obtained.

DETAILED DESCRIPTION OF THE PREFERRED EMBODIMENTS OF THE INVENTION

The preferred embodiments of this invention will be better understood by those skilled in the art by reference to the above Figures. The preferred embodiments of this invention illustrated in the Figures are neither intended to be exhaustive nor to limit the invention to the precise form disclosed. The Figures are chosen to describe or to best explain the principles of the invention, and its application and practical use to thereby enable others skilled in the art to best utilize the invention. Specifically, the invention is disclosed as a pressure sensor and pressure system for illustrative purposes only. The invention is equally applicable for use in other types of sensors and systems, such as force sensors and accelerometers.

Figure 1:
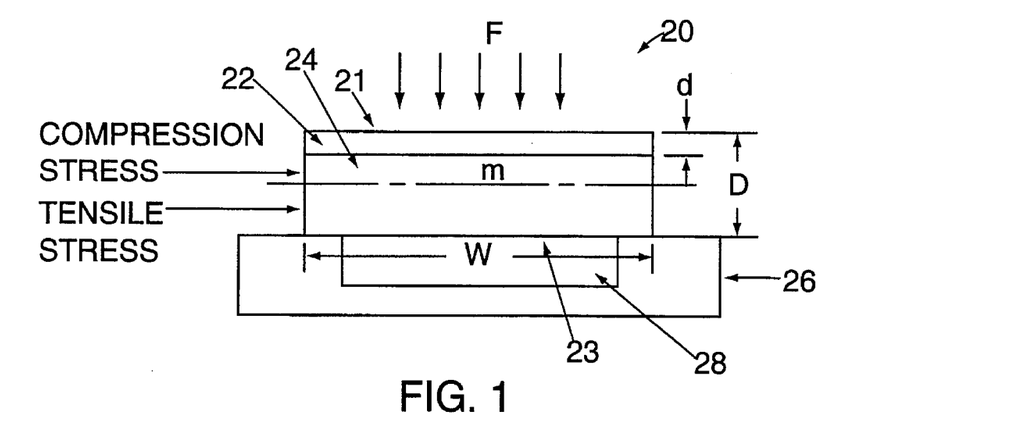
FIG. 1 is an elevation view of a cladded pressure sensor and stressed therein.

The above objects and many other objects and advantages of the invention are achieved by a cladded pressure sensor 20 as shown in FIG. 1. The sensor acts as a single composite plate comprised of two isotropic plates 22 and 24, preferably glass or fused silica laminated together. Preferably, plate 22 is an undoped phosphate glass and plate 24 is an Nd doped phosphate glass. Other glasses are useful, such as aluminosilicate glass and Cu doped aluminosilicate glass. Plate 22 has an index of refraction $n_1$, and plate 24 has an index of refraction $n_2$ where $n_1 > n_2$. Plate 22 has a higher refractive index than plate 24 and the medium surrounding sensor 20 by such an amount that light propagates within plate 22 via refractive index confinement and therefore will not refract into plate 24 or the surrounding medium. The surrounding medium can be either a gas, liquid or another solid. Plate 24 is manufactured so that it effectively absorbs over the optical path length the optical spectrum of the light source that is incident on plate 24. For example, plate 24 may be doped with Nd, Cu, Cr, Ho, Er, Dy or any other dopant necessary to obtain absorption in the frequency band of interest. Furthermore, the coefficients of thermal expansion of plate 22 and 24 are closely matched so that the fusion bond between the plates results in a residual stress level well below expected signal levels due to the presence of an externally applied force or pressure F. In short, the combination of plates 22 and 24 appear to act as a single composite plate when external pressures are applied.

The magnitude of the measured force F applied to sensor 20 relates to the physical parameters of sensor 20 such as thickness, diameter, birefringent constant, Young's Modulas and Poisson's coefficient. For example, bending stress is proportional to $(W/D)^3$. Therefore, in order to measure wide ranges of pressure accurately, it is preferred that dimension W is much greater that dimension D. Sensor 20 is polished to the desired thickness, D, where the thickness, d, of plate 22 is greater than the thickness which causes plate 22 to act as an optical waveguide with distinct modal qualities. Thickness D determines the operating parameters of sensor 20 before failure due to rupture. For example, W may be in the range of 0.5 to 1.0 inches, d may be in the range of 0.008 inches to 0.015 inches and D is about 0.040 to 0.080 inches. Sensor 20 is preferably rectangular-shaped for ease of manufacturing, however, it may be other geometric shapes, as for example, shown in FIG. 1a. Opposing flats 30 and 32 are polished onto the edge of the disk perpendicular to the major faces 21 and 23, for the beam to propagate transversely through sensor 20.

Figure 1A:
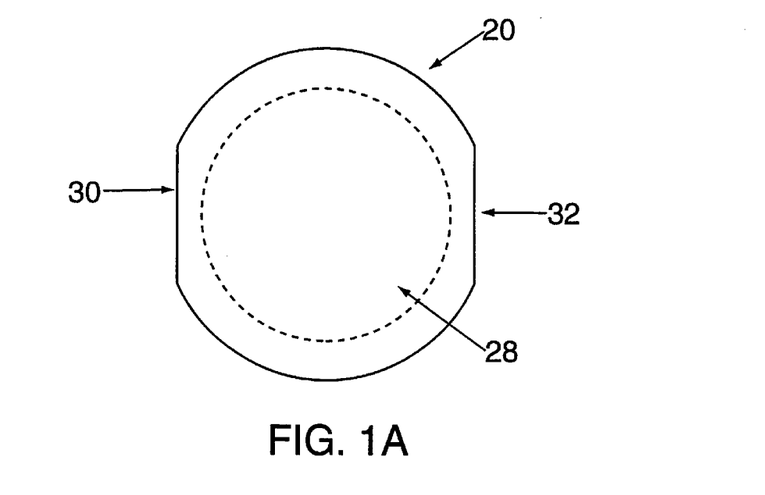
FIG. 1a is a plan view of one embodiment a cladded pressure sensor.
Figure 1B:
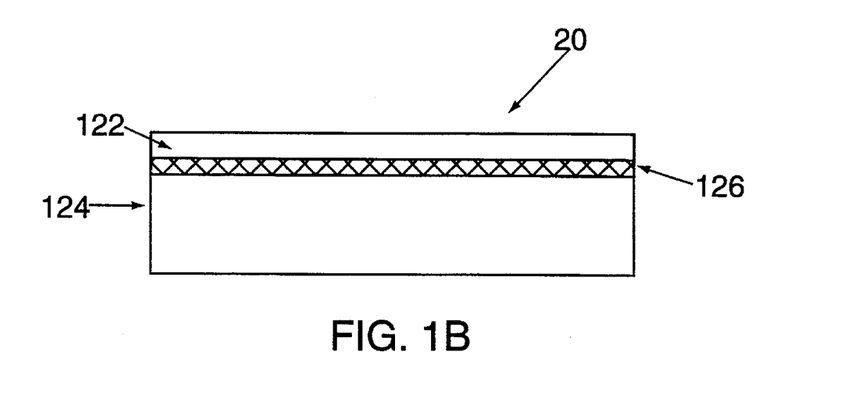
FIG. 1b is an elevation view of an alternate embodiment of a cladded pressure sensor.

FIG. 1b illustrates an alternate embodiment of sensor 20. Plates 122 and 124 are preferably made of the same material, such as fused silica, but it is not necessary. The plates are separated by an interface 126 that has a lower index of refraction than either plates 122 and 124 by at least 0.001. Interface 126 is a doped portion, for example fluorine, of either plate 122 or 124 and need only be about 1000 to 10,000 Å thick. Additionally, the amount of doping required is so slight so that there is a negligible difference of the thermal coefficient of expansion between the plates and interface. In this embodiment, it is also necessary to block light so it will not enter plate 124 from edge 30 or 32.

Figure 2:
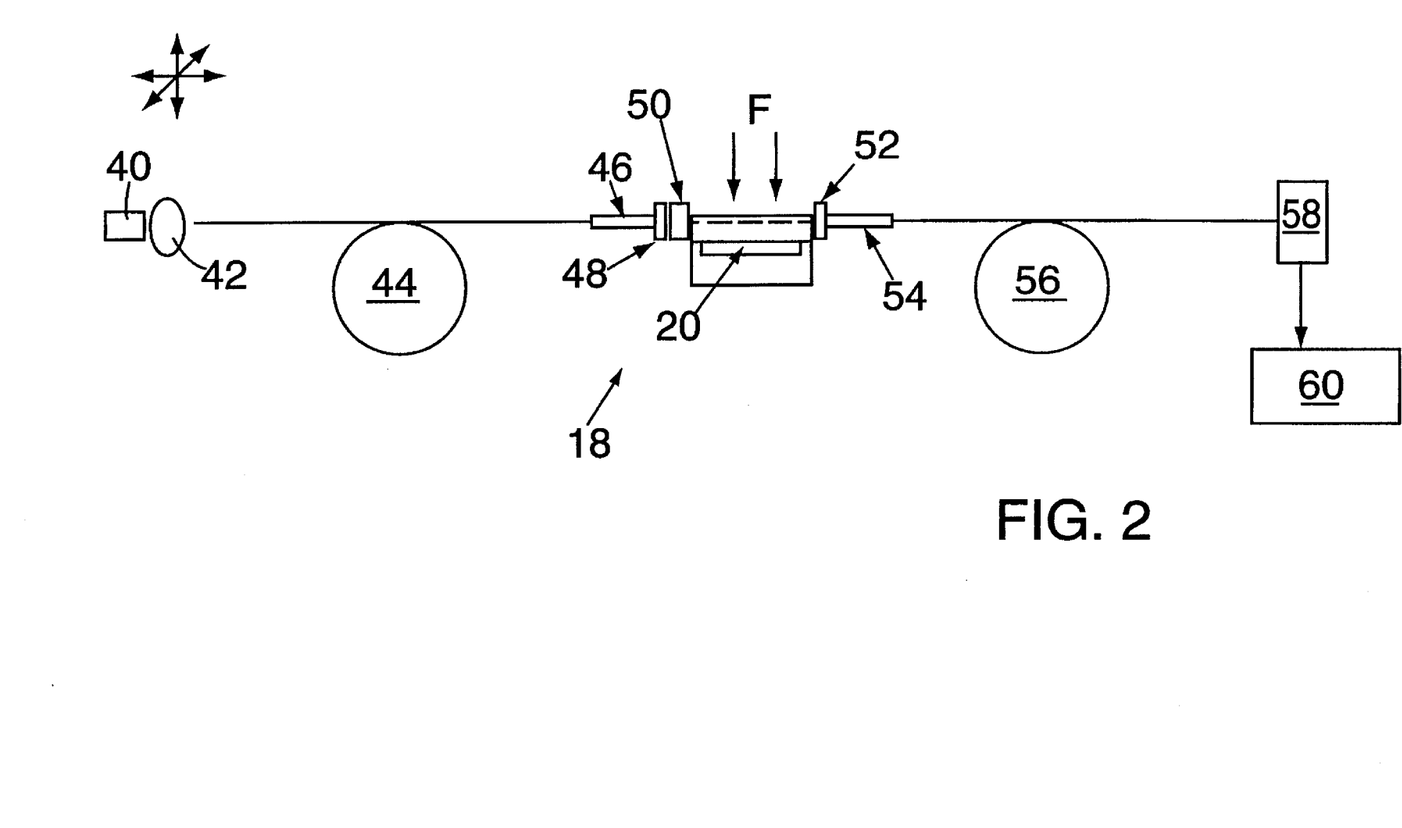
FIG. 2 is a pressure-sensing system employing a cladded pressure sensor.

FIG. 2 illustrates a pressure sensing system 18 utilizing sensor 20. System 18 utilizes a broad band light source 40 as may be generated by a plurality of wide band LEDs having an exemplary waveform illustrated in FIG. 3. The broad band light source 40 is randomly polarized and is focused by lens 42 into a multi-mode optical fiber 44. The light output of fiber 44 is collimated by lens 46, such as a gradient index lens, and is directed through a polarizer 48 that passes only linear polarized light preferably with a >100:1 extinction ratio to provide an acceptable signal-to-noise ratio. However, an extinction ration of 2:1 would still provide an acceptable signal for this invention. Polarizer 48 is aligned so that it transmits the linearly polarized light at 45° to the optical axis of a birefringent crystal element 50.

Generally, crystals are anisotropic with respect to their physical properties, that is, their property values vary with the direction in the crystal. Anisotropy of the refractive index is called birefringence and is defined as $n_e - n_o$ where $n_e$ is the extra-ordinary index of refraction and $n_o$ is the ordinary index of refraction is the canonical value used in available temperature sensing devices that describes the number of full cycle of polarization rotation that the linearly polarized broad band light undergoes during transmission through the crystal. This number is a result of a particular detection system that has a maximum sensitivity and reduced error for values between 30 and 50. Certain crystals can be categorized as positive or negative depending on whether the $n_e$ term is larger or smaller than $n_o$. The terms $n_e$ and $n_o$ are not used for crystals that have 3 separate refractive indices such as BeL (Beryllium Lanthanate). In that case, terms such as $n_a$, $n_b$, and $n_c$ can be used and any 2 such terms and their respective temperature dependent birefringent terms can be substituted giving a total of 3 separate cases for this class of crystals.

Figure 4:
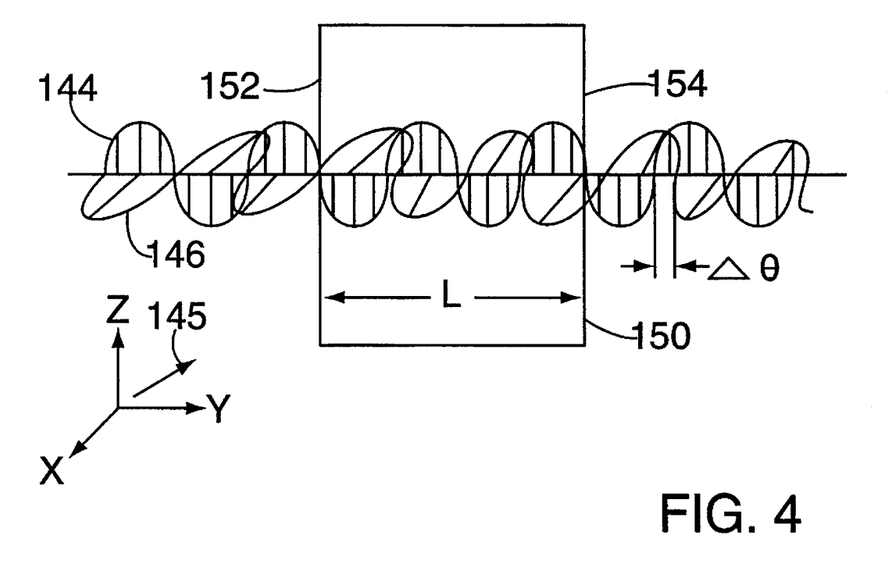
FIG. 4 is an illustrative schematic of a polarized light source prior to entering, passing through and exiting an birefringent crystal element.

FIG. 4 illustrates the principles of birefringence. Two orthogonally polarized waves 144 and 146 enter and propagate through a birefringent element 150. The electric polarization vectors of these two waves are oriented in the X and Z directions, and the waves propagate in the Y direction. On entering face 152, the linearly polarized wave, propagates through element 150 at different velocities due to different refractive indices in the x and z planes. Therefore, waves 144 and 146, which exhibited a zero phase difference before entering element 150, now exhibit a certain phase difference $\Delta\theta$ on exiting face 154. The phase difference depends on the difference in the indices of refraction, the path length, L, through the birefringent element 150, the temperature of crystal 150 and the wavelength of the broad band light source.

Birefringent element 50 adds an adequate birefringent term to the polarized light before it enters sensor 20 so that light transmission occurs even under zero stress conditions. Since sensor 20 possesses extremely small induced birefringence under isostatic pressure conditions, sensor 20 is "biased" by a birefringent single crystal plate with the following condition:

$$ABS \cdot [L_1 \cdot B_1] = X \cdot \lambda \quad [1]$$

Where $L_1$ is the respective crystal 50 length, $B_1$ is the respective birefringence, $\lambda$ is the central wavelength of the broad band light source 40, and ABS refers to the absolute value of the enclosed terms. X represents approximately the number of orders of the effective waveplate. X is a function of the overall system design, including the wavelength and band of light source 40 and the opto-electronic interface 58 that has its own characteristic wavelength range and resolution. Desired system accuracy determines the amount of birefringent bias and the value of X. Exemplary values of X may be in the range from about 20 to 60. It is possible to increase or decrease the birefringent bias in relation to changes of other system parameters and still maintain overall system accuracy.

Referring again to FIG. 2, after the linear polarized light is birefringently biased, the light enters flat 30 (FIG. 1a) polished onto the edge of sensor 20 so the optical axis of crystal 50 is aligned with the mechanical axis of sensor 20. The biased collimated light source is positioned so that the light is parallel to surfaces 21 and 23 and propagates perpendicular to flat 30. The light should be arranged so that at least some of the light enters top plate 22. Any light that enters plate 24 is absorbed by the optical absorbance characteristics required of that material. Light that enters plate 22 will not refract into plate 24 due to the higher refractive index of plate 22 with respect to plate 24, or in the alternate embodiment, due to interface 126 (FIG. 1b).

Figure 1C:
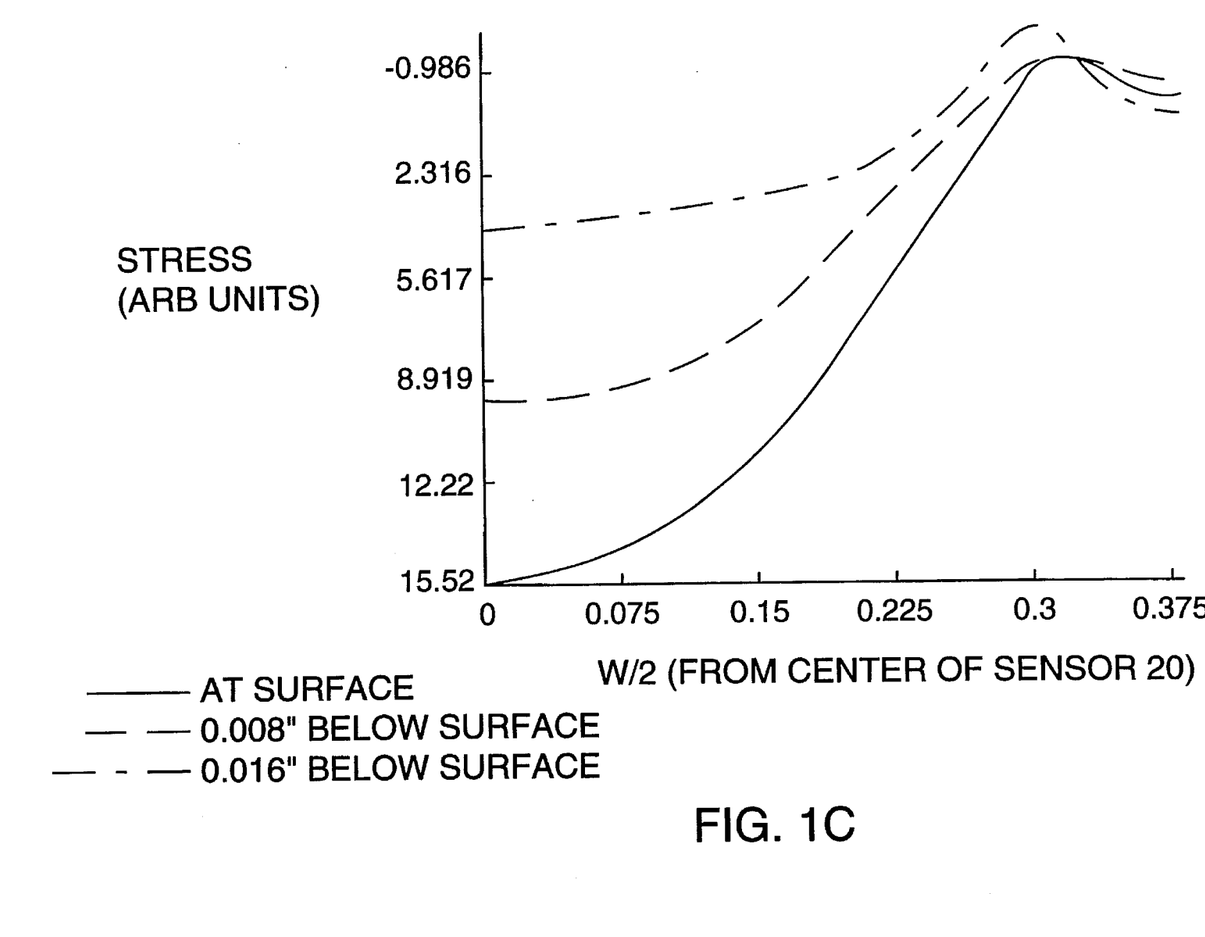
FIG. 1c is a graphical representation of stresses within a cladded pressure sensor.

Referring to FIG. 1, sensor 20 rests on a base 26 such that a reference pressure, for example, a vacuum, is present in a cavity 28. Preferably, cavity 28 is circular as shown in FIG. 1a to eliminate point stresses. With force or pressure F exerted on surface 21, compressive and tensile stresses are induced in sensor 20. Such stresses comprise compressive stresses in the upper half D/2 dimension and tensile stresses in the lower half D/2 dimension when pressure F is greater than the reference pressure in cavity 28. The relative magnitude of the stresses is depicted in FIG. 1c which illustrates maximum compressive stresses at the surface and center of sensor 20. Tensile stresses are of the same magnitude, but opposite in sign. At the geometric midpoint M of sensor 20, the stresses cancel each other out and the effective stress is zero. Accordingly, dimension d is minimized so that the light specifically passes near surface flat 21, which is the area of maximum compressive stress.

The measured compressive stress extends in a direction orthogonal to the propagation of light through sensor 20. The photoelastic effect of such orthogonal stresses upon the transmitted light flux is to delay one of the components of light, $L_x$ with respect to the other component $L_z$. "Photoelasticity" by Max Mark Frocht, Volume II, Chapter 10, pages 333–37, John Wiley & Sons, Inc. 1948 and "Principles of Optics" by Max Born and Emil Wolf, Fifth Ed., pages 703–05, Pergamon Press, 1975 detail the photoelastic effect of stress birefringence. The optical phase delay is produced by stress-induced birefringence in plate 22 that causes the biased light passing through plate 22 to experience a further phase delay $\Delta\theta'$ which is proportional to pressure F applied to sensor 20. The delaying effect is cumulative along the light path, and an extended light path magnifies and increases the sensitivity of sensor 20.

Figure 5:
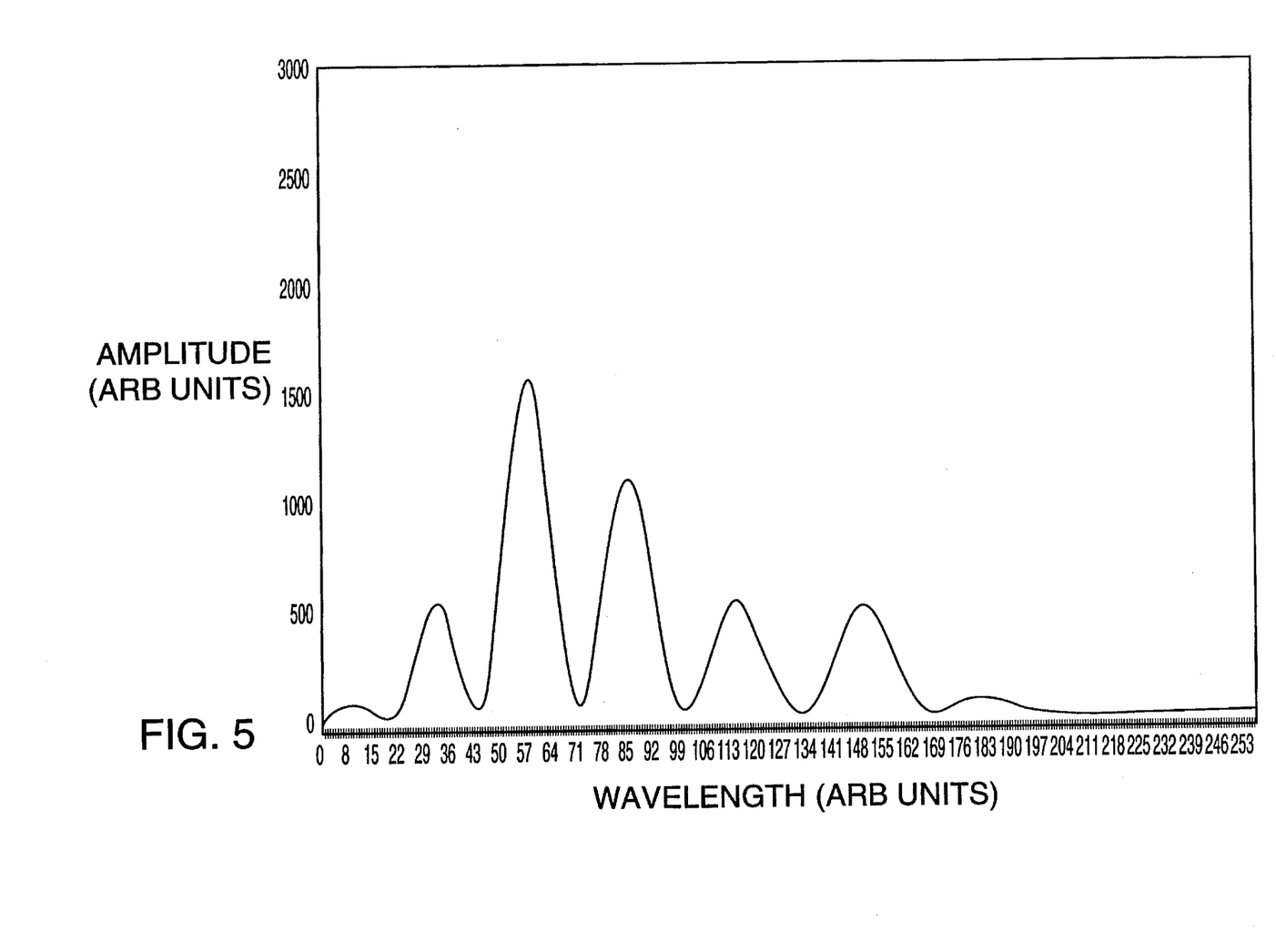
FIG. 5 is a fringe pattern relative to the pressure or force applied to the pressure sensor.
Figure 6:
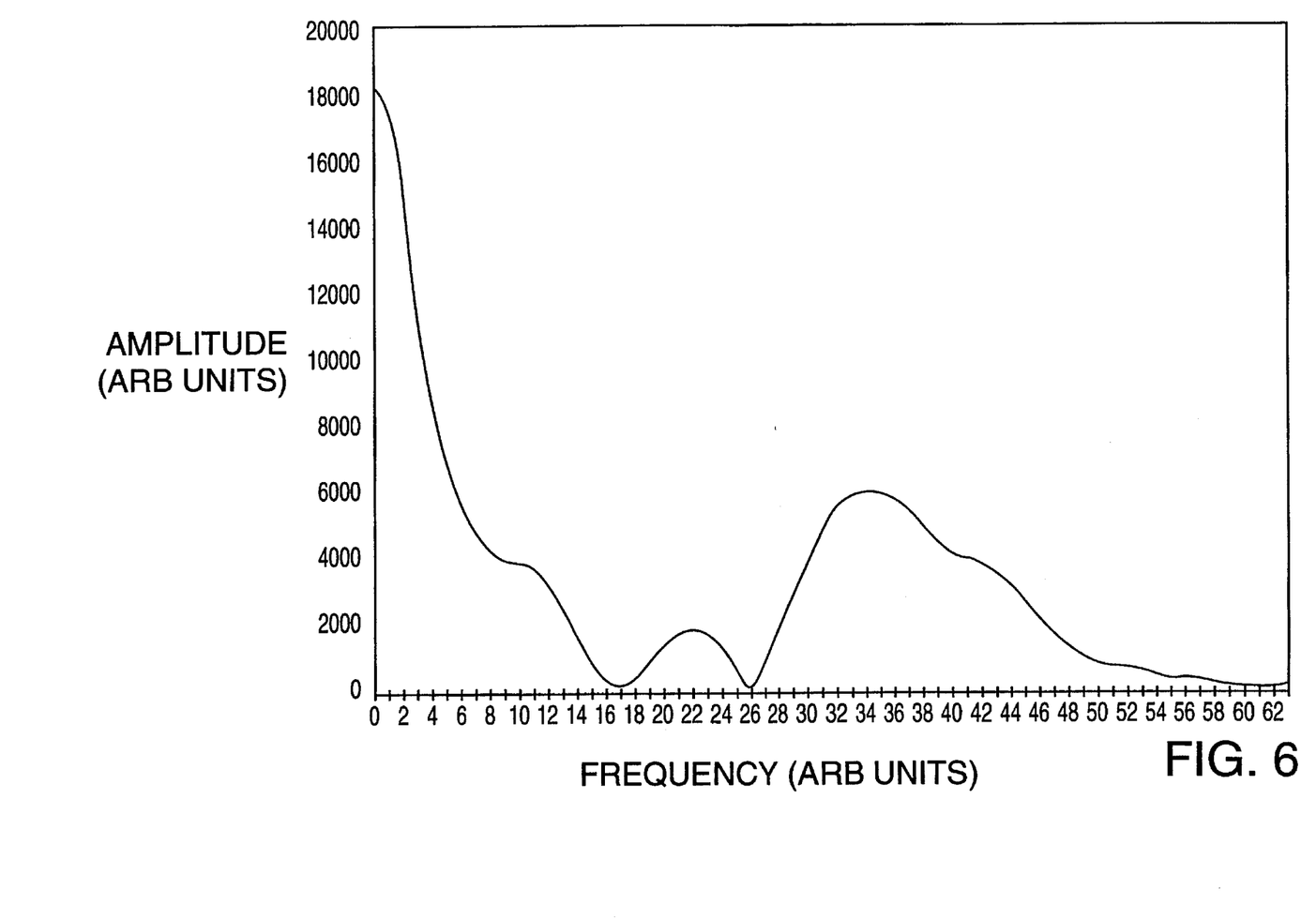
FIG. 6 is a graphical representation of an analyzed fringe pattern.
Figure 7:
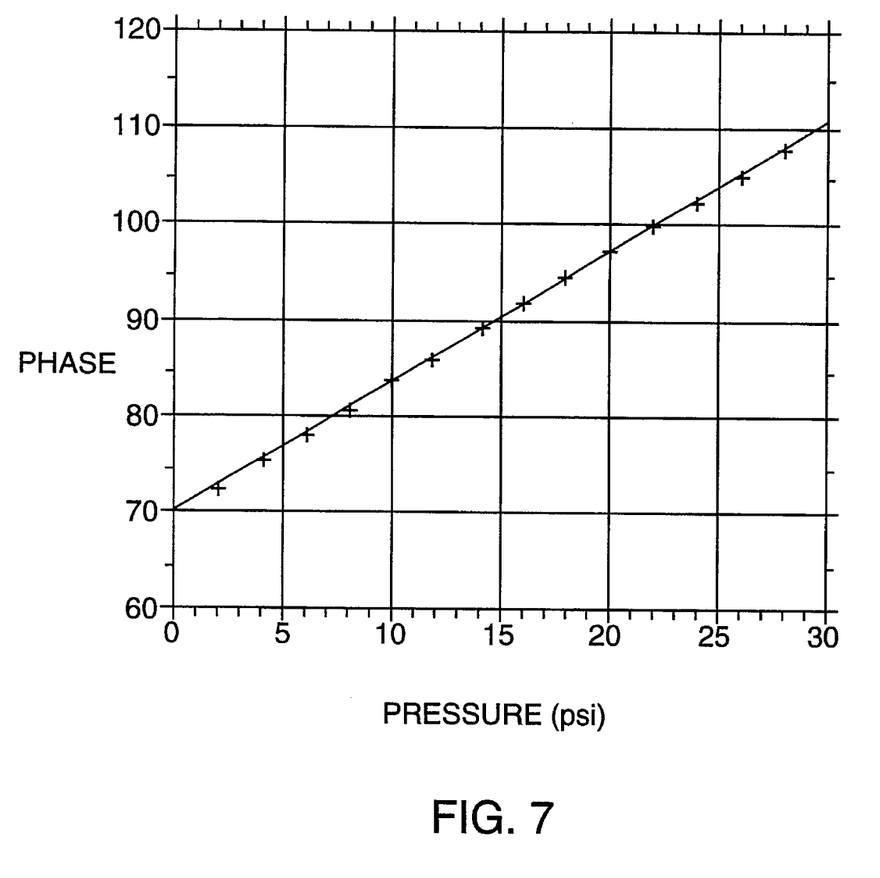
FIG. 7 is a graphical representation of the linear relationship between pressure and phase changes.

The light exits plate 22 via flat 32 polished parallel to and opposite flat 30. The light passes through a second polarizer 52, commonly known as an analyzer, with the same or a 90° orientation to input polarizer 48. When the orthogonally polarized waves are combined by polarizer 52, a modulated light spectrum is produced. This modulated light spectrum is transmitted via collector lens 54 into a fiber optic cable 56. The output of the fiber optic cable is directed to an optoelectronic interface, such as a spectrometer having a fiber optic input and a ccd array output. The light spectrum is focused onto an array of photodetectors or a charge coupled detector 58 associated with conditioning electronics which yields the intensity vs. time (intensity vs. wavelength) fringe pattern signal as shown in FIG. 5. A CPU 60 digitizes the signal and performs a Fourier Transform on the signal, which resultant is shown in FIG. 6. The measured phase shift of the transformed signal is a direct representation of the external pressure F applied to the isotropic sensor 20. A graphical representation of the pressure/phase change is shown in FIG. 7.

EXAMPLE

Figure 3:
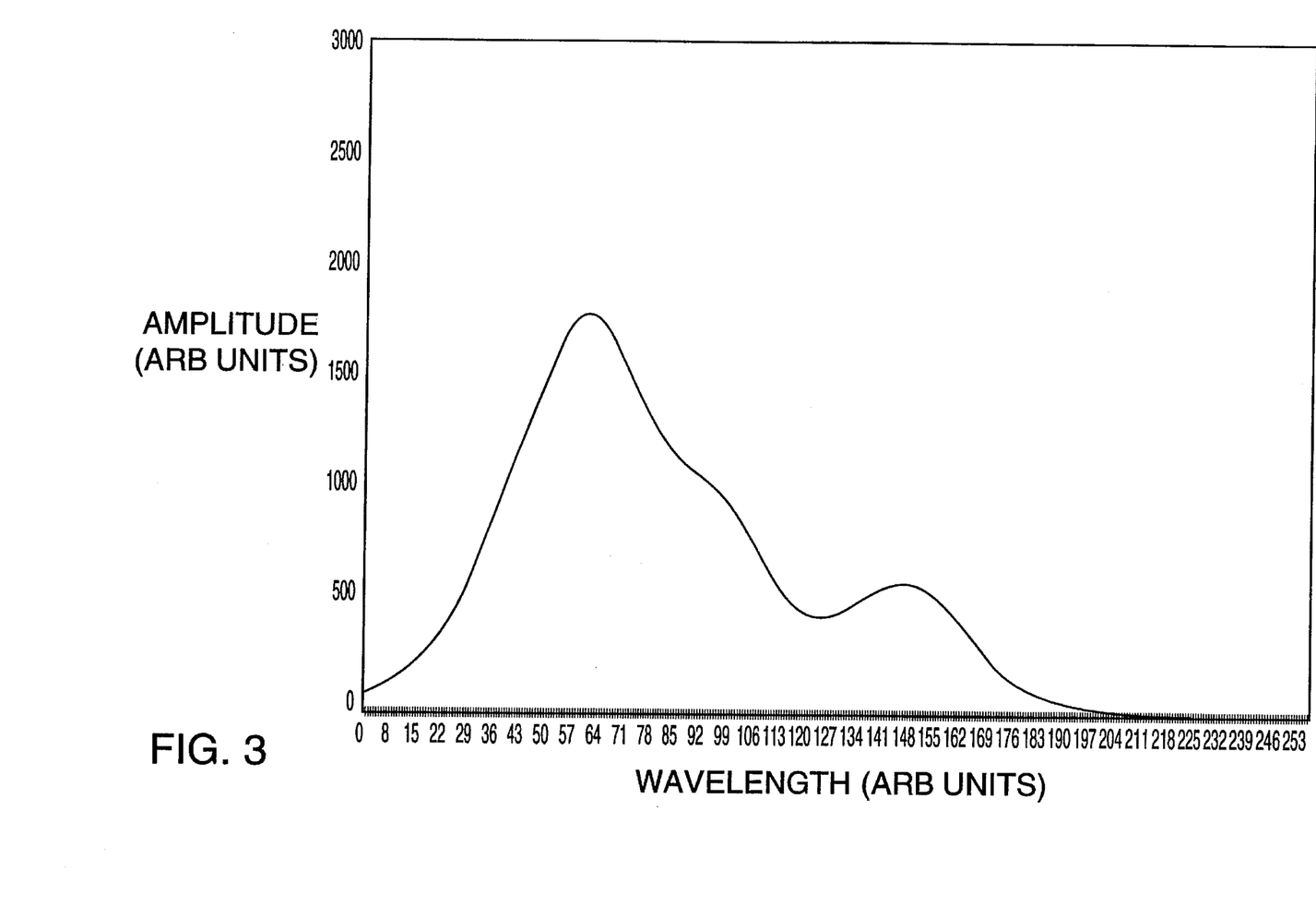
FIG. 3 is the amplitude/frequency waveform of the broad band light source.

The light source 40 used in a demonstration unit consists of a single LED package that contains three LEDs. This generates a wavelength spectrum as shown in FIG. 3. The 10% end points are at 760 and 900 nm respectively; the pixel numbers associated with FIG. 3 are the ccd array element numbers. The optoelectronic interface 58 has a 256 element ccd array as the detection system. Dispersion elements inside the unit have pixel number 1 at 748 nm and pixel number 256 at 960 nm. The entire LED spectrum is therefore observed on the ccd array yielding intensity vs wavelength information. In the preferred case there will be six to ten fringes produced on this ccd array due to the action of the 2 polarizers and the bias crystal located between them. Six to ten fringes have been determined to give the required system accuracy and low production costs of the hardware involved. This number of fringes determines the amount of birefringence length product that the bias crystal must provide. In this demonstration, the birefringence crystal was $YVO_4$ having a birefringence of 0.2155 at 830 nm and was cut to a length of 0.125 mm. Solving for equation 1, X is determined to be about 33. FIG. 5 shows a number of fringes are within the optimum conditions of the detection system. FIG. 6 shows the Fourier Transform of FIG. 5. The largest amplitude signal peaked at 0 frequency (arb. units) is due to dc terms. The small amplitude feature peaked at frequency 22 (arb. units) is due to the wavelength spacing of the three LEDs that comprise the light source 40. The larger amplitude signal peaked at frequency 33 (arb. units ) is due to the birefringent bias. The phase information at this frequency will be related to stress-induced birefringence generated in sensor 20 which is a direct function of the pressure.

This light source, birefringent bias, and detection system form a selfconsistent arrangement that is capable of the required accuracy. There are many other combinations that can achieve the same results. For example; The LED light source can be located at another wavelength and have a width that is considerably narrower than that used in the previous example. This would require a detection system that operates at a different wavelength and has a higher resolution requirement so as to spread out the wavelengths over the same number of pixels. To achieve the same number of fringes, the birefringent bias will have to be increased which can be accomplished by changing the birefringent crystal and/or changing its propagation length.

We claim:

1. A photoelastic sensor comprising:

a) a first photoelastic plate.

b) a second plate optically bonded to said first plate; whereby light travels through said first plate via refractive index confinement and an application of force to said first plate results in said first and second plates to deform causing nonlinear stresses across the thickness of said first and second plates causing a stress-induced birefringence resulting in components of said light to experience a phase delay proportional to said force.

2. The sensor of claim 1 wherein said first plate is further characterized by an index of refraction $n_1$ and said second plate is further characterized by an index of refraction $n_2$ and $n_1 > n_2$.

3. The sensor of claim 1 further comprising an interface between said first and second plates wherein said interface is characterized by an index of refraction $n_1$, said first plate is characterized by an index of refraction $n_2$, said second plate is characterized by an index of refraction $n_3$ and $n_1 < n_2$ and $n_3$.

4. The sensor of claim 1 wherein said first and second plates are glass.

5. A pressure sensor system for providing a frequency signal indicative of an environmental pressure comprising:

a) a sensor for receiving a linearly polarized light wave comprising:

i) a first photoelastic plate;

ii) a second photoelastic plate optically bonded to said first plate;

whereby at least a portion of said light travels through said first plate via index refractive confinement, said linearly polarized wave decomposing into first and second orthogonally polarized waves, and an application of force to said first plate results in said first and second plates to deform causing nonlinear stresses across the thickness of said first and second plates causing a stress-induced birefringence resulting in said first and second orthogonally polarized waves to experience a phase difference proportional to said force on propagating through said first plate; and       b) a polarizer for combining said first and second orthogonally polarized waves to create a modulated light spectrum having a fringe pattern, said fringe pattern being a function of said environmental pressure.

6. The pressure sensor system of claim 5 further comprising:

c) an opto-electronic interface for accepting said modulated light spectrum output from said polarizer and producing a corresponding electrical signal; and     d) computing means for conditioning said electrical signal to extract a waveform at a specified frequency to determine said environmental pressure.

7. The pressure sensor system of claim 5 further comprising means for birefringent biasing said linearly polarized wave.

8. The pressure sensor system of claim 7 wherein said birefringence biasing means is a lanthanum beryllate crystal having a birefringence of 0.07.

9. A pressure sensor system for providing a frequency signal indicative of an environmental pressure comprising:

a) a first linear polarizer element for orienting an initial randomly polarized broad band light source into a linearly polarized light wave;

b) a birefringent crystal for receiving said linearly polarized light wave from said first polarizer, said linearly polarized wave decomposing into first and second orthogonal polarized waves, said orthogonal waves experiencing a phase difference on propagating through said birefringent crystal;

c) a sensor for receiving said phase-shifted orthogonal waves comprising:
      i) a first photoelastic plate;
      ii) a second photoelastic plate optically bonded to said first plate;

whereby at least a portion of said orthogonal waves travels through said first plate via refractive index confinement, an application of force to said sensor results in said first and second plates to deform causing nonlinear stresses across the thickness of said first and second plates causing a stress-induced birefringence resulting in said first and second orthogonally polarized waves to further experience a phase difference on propagating through said first plate, said further phase difference is proportional to said force; and     d) a second polarizer for combining said first and second orthogonally polarized waves to create a modulated light being a function of said environmental pressure;

e) an opto-electronic interface for accepting said modulated light spectrum output from said second polarizer and producing a corresponding electrical signal; and     f) computing means for conditioning said electrical signal to extract a waveform at a specified frequency to determine said environmental pressure.

\* \* \* \* \*